United States Patent [19]

Freeman

[11] Patent Number: 6,108,515

[45] Date of Patent: Aug. 22, 2000

[54] INTERACTIVE RESPONSIVE APPARATUS WITH VISUAL INDICIA, COMMAND CODES, AND COMPREHENSIVE MEMORY FUNCTIONS

[76] Inventor: Michael J. Freeman, 1270 Avenue of the Americas, Suite 2401, New York, N.Y. 10020

[21] Appl. No.: 08/925,850

[22] Filed: Sep. 9, 1997

Related U.S. Application Data

[63] Continuation-in-part of application No. 08/749,345, Nov. 21, 1996, Pat. No. 5,930,757.

[51] Int. Cl.[7] .................................................. G09B 7/06
[52] U.S. Cl. ........................ 434/321; 434/185; 434/316; 434/318; 434/342; 463/43; 360/27; 369/41; 704/272
[58] Field of Search .................................... 434/116, 157, 434/185, 307 R, 308, 315, 316, 318–325, 332, 336, 338, 342, 351, 352; 463/43, 35; 348/472, 482, 483; 360/27, 28, 32, 72.1; 40/455; 704/231, 246, 251, 257, 272; 446/175, 484; 386/99; 369/32, 33, 41, 50, 277; 345/978; 346/33 M

[56] References Cited

U.S. PATENT DOCUMENTS

| | | |
|---|---|---|
| 2,777,901 | 1/1957 | Dostert . |
| 2,826,828 | 3/1958 | Hamilton . |
| 2,908,767 | 10/1959 | Fritzinger . |
| 2,921,385 | 1/1960 | Hamilton . |
| 3,020,360 | 2/1962 | Gratian et al. . |
| 3,194,895 | 7/1965 | Treadwell . |
| 3,245,157 | 4/1966 | Laviana . |
| 3,255,536 | 6/1966 | Livingston . |
| 3,273,260 | 9/1966 | Walker . |
| 3,284,923 | 11/1966 | Leslie . |
| 3,343,280 | 9/1967 | Tolnai . |
| 3,477,144 | 11/1969 | Stillit . |
| 3,484,950 | 12/1969 | Serrell et al. . |
| 3,538,621 | 11/1970 | Mayeda . |
| 3,546,791 | 12/1970 | Koos et al. . |

(List continued on next page.)

OTHER PUBLICATIONS

Usami, Shozo, "Parallel Random Access System: A New Method to Improve Foreign Language Training", Educational Technology, Feb. 1979, pp. 33–35.

*Primary Examiner*—Joe H. Cheng

[57] ABSTRACT

An interactive conversational apparatus provides seamless uninterrupted conversational responsiveness to a variety of user inputs utilizing a storage media having a plurality of temporally related data storage tracks containing interactive conversational content. The conversational content and control code information are stored on tracks in a timed sequence for providing interactive pathways through the tracks dependent upon various user responses. A media player facilitates playback of the interactive conversational content. A control code reader reads the control code information and generates track selection information based upon the control codes. User-input buttons or keys receive responses from a user based upon the interactive conversational content. A track selector receives the track selection information and user-input responses, and accesses the tracks of the storage media in response to the user-input responses and the control code information for enabling the playback of the conversational content. The control codes include memory storage commands and memory switching commands, a switch-to-track command, a switch-to-track-in-memory command, an accumulation command, a command for storing in memory a response to a particular interrogatory, a command for switching to a particular track based upon the response to the interrogatory stored in the memory, start playback, stop playback, pause playback until a user-input response is received, a command to selectively operate the visual indicia of a particular switch in timed relation to interactive conversational content related to the particular switch, and a command to selectively flash the visual indicia of a particular switch.

22 Claims, 2 Drawing Sheets

U.S. PATENT DOCUMENTS

| | | |
|---|---|---|
| 3,623,238 | 11/1971 | Laplume et al. . |
| 3,665,615 | 5/1972 | Laplume . |
| 3,708,891 | 1/1973 | Rosov . |
| 3,735,503 | 5/1973 | Dow et al. . |
| 3,763,577 | 10/1973 | Goddson . |
| 3,774,316 | 11/1973 | Meier . |
| 3,947,972 | 4/1976 | Freeman . |
| 3,955,466 | 5/1976 | Goldmark ................................ 84/470 |
| 4,048,729 | 9/1977 | Derks ...................................... 434/320 |
| 4,078,316 | 3/1978 | Freeman . |
| 4,117,605 | 10/1978 | Kurland et al. . |
| 4,170,832 | 10/1979 | Zimmerman . |
| 4,221,927 | 9/1980 | Dankman et al. . |
| 4,264,924 | 4/1981 | Freeman . |
| 4,264,925 | 4/1981 | Freeman et al. . |
| 4,318,245 | 3/1982 | Stowell et al. . |
| 4,389,681 | 6/1983 | Tanaka et al. . |
| 4,420,656 | 12/1983 | Freeman . |
| 4,445,187 | 4/1984 | Best . |
| 4,571,640 | 2/1986 | Baer . |
| 4,573,072 | 2/1986 | Freeman . |
| 4,591,248 | 5/1986 | Freeman . |
| 4,643,682 | 2/1987 | Migler ..................................... 379/980 |
| 4,690,645 | 9/1987 | Ukisu ...................................... 434/309 |
| 4,749,354 | 6/1988 | Kerman . |
| 4,753,597 | 6/1988 | Pash et al. . |
| 4,766,529 | 8/1988 | Nakano et al. . |
| 4,777,537 | 10/1988 | Ueno et al. . |
| 4,799,171 | 1/1989 | Cummings . |
| 4,847,699 | 7/1989 | Freeman et al. . |
| 4,896,357 | 1/1990 | Hatano et al. . |
| 4,923,428 | 5/1990 | Curran ................................ 424/319 X |
| 5,166,804 | 11/1992 | Takahashi . |
| 5,213,510 | 5/1993 | Freeman . |
| 5,281,143 | 1/1994 | Arad et al. . |
| 5,324,225 | 6/1994 | Satoh et al. . |
| 5,340,317 | 8/1994 | Freeman . |
| 5,377,303 | 12/1994 | Firman . |
| 5,930,757 | 7/1999 | Freeman ................................. 704/272 |

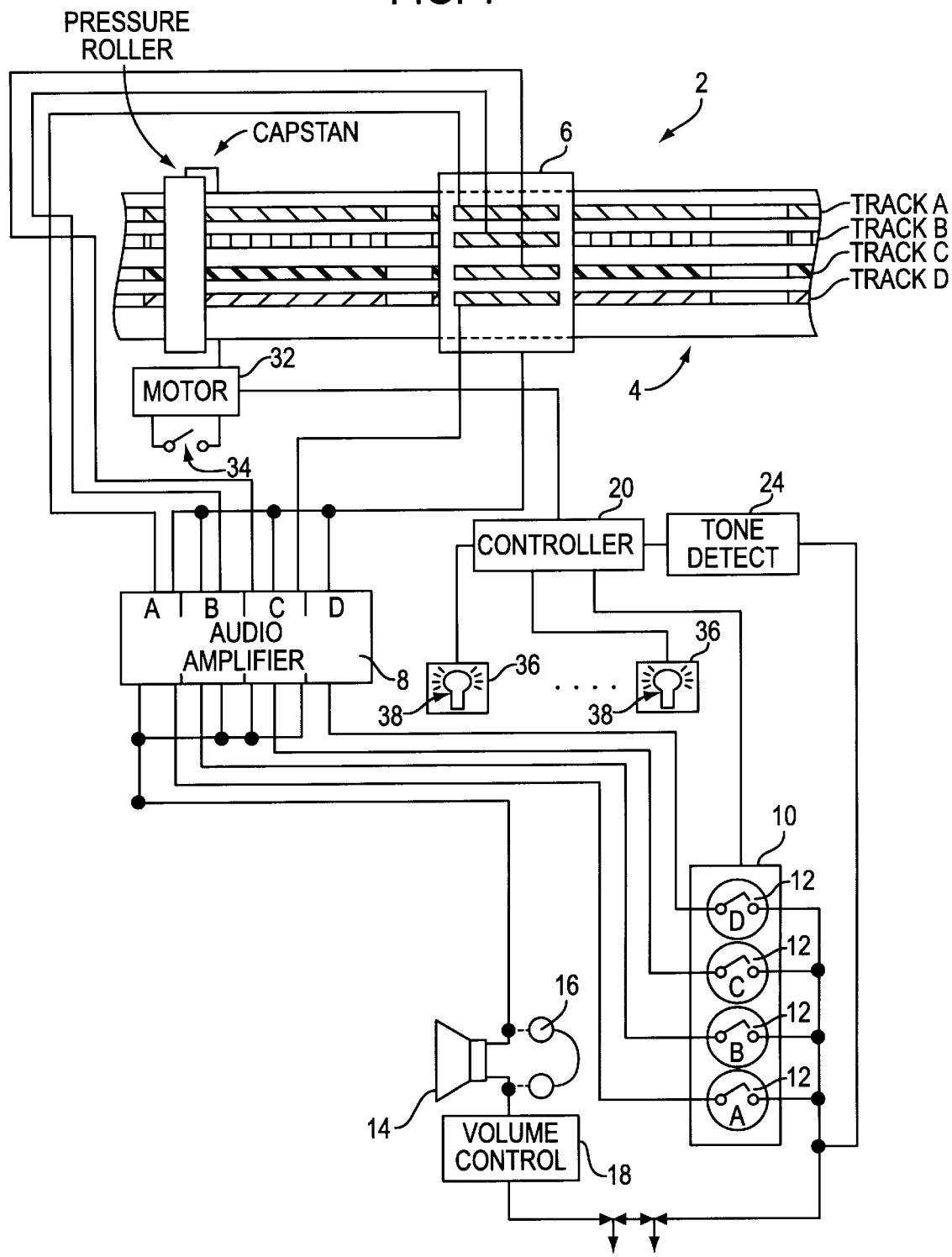

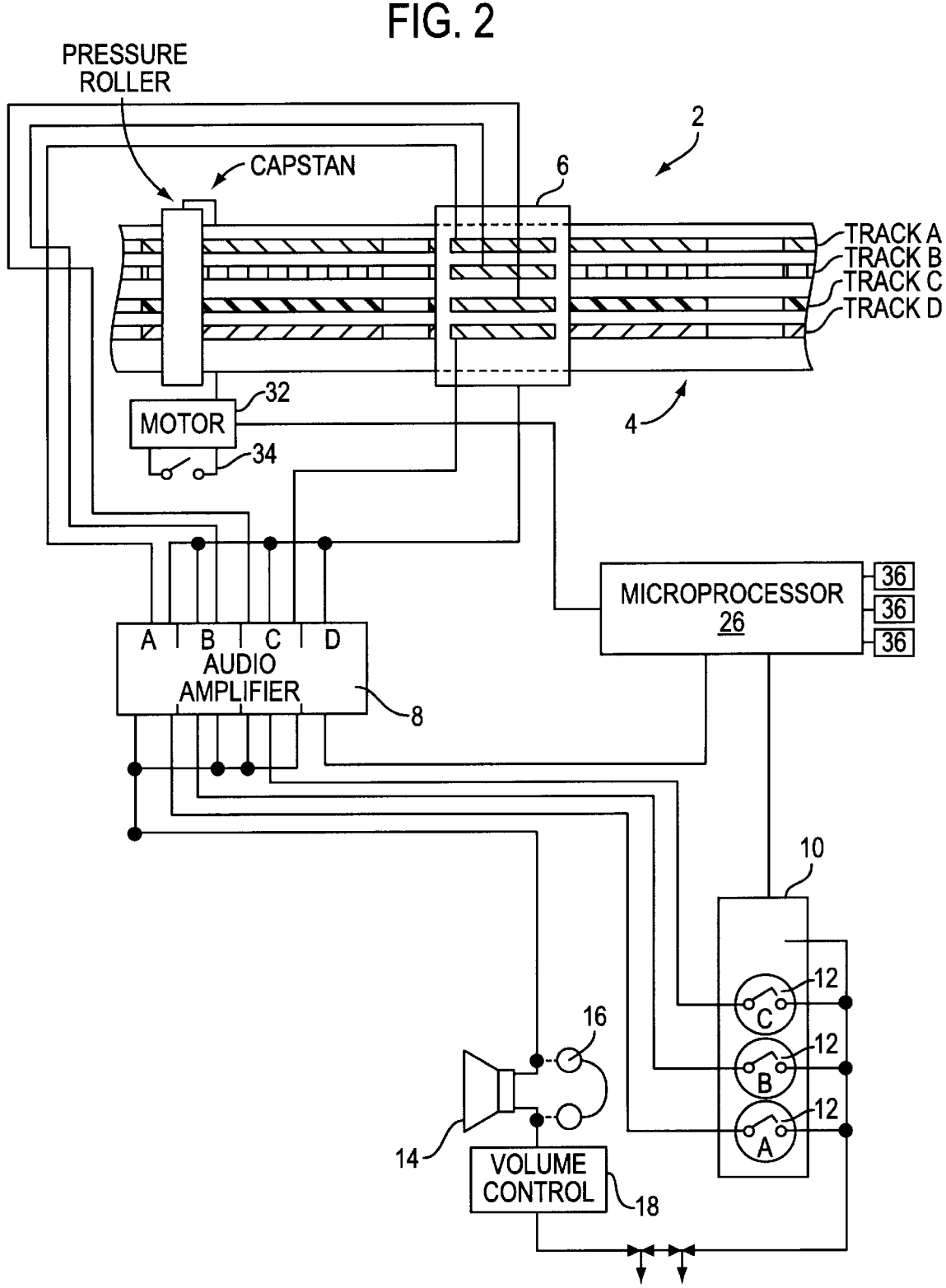

INTERACTIVE RESPONSIVE APPARATUS WITH VISUAL INDICIA, COMMAND CODES, AND COMPREHENSIVE MEMORY FUNCTIONS

CROSS-REFERENCE TO RELATED APPLICATION

This is a continuation-in-part of commonly-owned U.S. patent application Ser. No. 08/749,345, filed Nov. 21, 1996, now U.S. Pat. No. 5,930,757, the contents of which are incorporated herein by reference.

BACKGROUND OF THE INVENTION

1. Field of the Invention

The present invention relates generally to interactive systems, and more particularly to an interactive conversational system which utilizes pre-recorded multi-track media to store interactive conversational content and which employs visual indicia, e.g., lighted buttons, a comprehensive command structure, and memory functions to provide more comprehensive conversational content and to facilitate use of the apparatus as an entertainment and educational tool.

2. Description of the Prior Art

Systems that perform interactive conversation are well known in the art. These systems have used a variety of different techniques to achieve interactive conversation. For example, commonly owned U.S. Pat. Nos. 3,947,972 and 4,078,316, the contents of each of which are incorporated herein by reference, disclose a conversational teaching apparatus which employs a time synchronized multi-track audio tape to store educational conversation messages. This device employs one track to relay interrogatories to a user. The tracks are then used, selectable by a manual switching mechanism, to convey responsive messages.

Commonly owned U.S. Pat. Nos. 5,313,510 and 5,340,317, the contents of each of which are incorporated herein by reference, improved upon the earlier conversational system by programming conversations on a magnetic media in a decision-tree logic which allowed more complex conversations to be developed. The information is stored on each track in a plurality of reproducible information segments which contain interrogatory messages and associated multiple choice responses, responsive messages, conversational messages, informational messages, and combinations thereof. The responsive messages contained on the tracks are related in real-time and content to particular interrogatory messages on the tracks, and correspond with multiple choice selectable responses. The apparatus could exhibit pseudo-memory and multiple simultaneous pseudo-memories; exhibit profiling and substitutability; and categorize and subcategorize users of the apparatus.

Commonly owned co-pending U.S. patent application Ser. No. 08/749,345 improved still farther upon the earlier conversational systems by utilizing a voice recognition controller to recognize verbal responses of the user. The voice recognition controller provides switching between tracks of the multi-track media in response to the verbal responses of the user in order to provide two-way verbal interaction between the user and the device.

Other multiple choice child response systems are exemplified by the systems disclosed in U.S. Pat. Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example.

In most existing interactive conversational systems, the user is instructed to push particular buttons, e.g., buttons "A", "B", "C", or "D", in response to interrogatories in order to guide the conversation. One weakness of such systems, especially for children, is that if a child is too young to know which button represents button "A", for example, the child cannot effectively use the device. Another weakness is that the extra iteration for a child to push a particular button that then has to be associated with a particular answer or response, is often confusing. Accordingly, it would be desirable to have an interactive conversational system in which visual indicia are used to identify and associate the buttons that correspond directly to each answer. This would enable such an interactive conversational apparatus to be used by younger children and make the system easier to use and more efficient for older children, and operate much more quickly.

Also, none of the prior systems utilizes comprehensive memory functions and command codes on a separate track of the multi-track media or embedded within the verbal content to provide more conversational responsiveness to the user's input and more complex programs. Utilization of such features would enable the apparatus to retain more long-term motivational, entertainment, and educational interests of a child.

SUMMARY OF THE INVENTION

The present invention is an interactive conversational apparatus which utilizes a storage media having a plurality of temporally related data storage tracks containing interactive conversational content. The interactive conversational content is stored on each track in a plurality of information segments, each of the segments being a complete message reproducible in response to the selection of the track upon which the segments are stored. Each of the information segments may be interrogatories having responses, responsive messages, informational messages, conversational messages, or combinations thereof related in real-time and content to information contained in at least one information segment of at least one track. The information is stored on the tracks in a predetermined timed sequence for providing interactive pathways through the tracks dependent upon the responses. In addition to the interactive conversational content, the storage media includes control code information.

Playback means, and more preferably a multi-track tape player, facilitates playback of the interactive conversational content of a selected data storage track. Control code reading means reads the control code information from the storage media and generates track selection information based upon the control codes. User-input response means, which is preferably a plurality of buttons each having an associated momentary switch, receives responses from a user based upon the interactive conversational content. Track selector means receives the track selection information and user-input responses, and selects and accesses one of the tracks of the storage media in response to the user-input responses and the control code information for retrieving the information stored on the selected track and for enabling the playback of the retrieved information via the playback means to thereby playback the interactive conversational content.

The temporally related data storage tracks are preferably stored on a magnetic storage media having a plurality of coextensive tracks, and the playback means includes magnetic storage media reading means corresponding to each of the plurality of coextensive tracks. In one embodiment, one of the data storage tracks comprises the command codes, and the apparatus includes command code playback means for providing playback of the track comprising the command codes independently of the tracks comprising the interactive conversational content. In this embodiment, the playback means includes magnetic media reading means for the command code track, and at least one magnetic media reading means for the coextensive tracks having the interactive conversational content. In an alternative embodiment, the tracks having the interactive conversational content also include audible or inaudible control commands for the command code reading means. In this embodiment, the apparatus further includes means for discriminating the audible or inaudible control commands from the interactive conversational content.

If desired, the tracks are stored digitally and are randomly accessible. The storage media is selected from the group consisting of magnetic disk, compact disk, video disk, magnetic tape, RAM, PROM, EPROM, and EEPROM. The data storage media may also be analog cassette tapes. The playback means preferably enables the removal and replacement of the storage media.

The command codes may include memory storage commands and memory switching commands. The apparatus may then further include means for storing a first identification of a current track being played in response to a memory storage command, and means for switching to the track associated with the first identification in response to a memory switching command.

The command codes may also include a "switch-to-track" command having an associated track number, the track selector means selecting the associated track upon receiving such command. Conventional memory is provided for storing information based upon the command code information. The command codes also include a switch-to-track-in-memory command for switching to a track stored in the memory. The track selector means selects the track in the switch-to-track-in-memory command upon receiving such command.

The command codes may also include i) an accumulation code for incrementing or decrementing the memory based upon the user-input track selections, ii) a code for storing in memory a response to a particular interrogatory, iii) a code for switching to a particular track based upon the response to the interrogatory stored in the memory, iv) start playback, v) stop playback, and v) pause playback until a user-input response is received.

The user-input response means is preferably a plurality of switches, each switch having selectively operable visual indicia, preferably a light. The command codes include codes for selectively operating the visual indicia such as i) a code to selectively operate the visual indicia of a particular switch in timed relation to interactive conversational content related to the particular switch; and ii) a code to selectively flash the visual indicia of a particular switch.

BRIEF DESCRIPTION OF THE DRAWINGS

FIG. 1 is a diagrammatic illustration, partially in schematic, of the selection, playback, and controller portions of one embodiment of the present invention.

FIG. 2 is a diagrammatic illustration, partially in schematic, of the selection, playback, and controller portions of an alternative embodiment of the invention.

DESCRIPTION OF THE PREFERRED EMBODIMENT

Referring now to the drawings in detail, and initially to FIG. 1, the mechanism of the real-time interactive conversational apparatus of the present invention is generally similar to that disclosed in commonly owned U.S. Pat. Nos. 3,947,972; 5,313,510; and 5,340,317. A conventional multi-track magnetic tape player 2 is utilized for retrieving audio information from a multi-track magnetic storage media 4 via multi-track playback head 6. The playback head 6 is preferably connected in conventional fashion to a conventional four channel audio amplifier 8, having one channel for each of the respective four tracks, A, B, C, D of multi-track tape 4 so as to conventionally play back the information stored on the respective audio tracks. Playback head 6 is preferably a conventional 4 channel audio playback head, with preferably equal head widths for each of the respective tracks A, B, C, D.

The output of audio amplifier 8 is preferably connected to a switch controller 10 which preferably incorporates a plurality of switches 12, with one switch being provided per track of multi-track tape 4. Each switch 12 is connected to the appropriate channel output of audio amplifier 8. Switches 12 are preferably conventional magnetic or electronic switches that are switched as desired by switch controller 10. Switches 12 are preferably connected between the output of audio amplifier 8 and a conventional audio output device, such as a speaker 14 or earphones 16, through a volume control 18. The other terminal of audio output device 14 or 16 is connected to audio amplifier 8 to complete the circuit. Thus, when one of switches 12 is closed, the output of the corresponding audio track A, B, C or D, all of which are being provided to audio amplifier 8 by multi-track playback head 6, is selectively provided to audio output device 14 or 16 to be heard by a child or other user.

Switch controller 10 is preferably connected to an output of a command controller 20, which is preferably a microprocessor. A motor 32 in tape player 2 causes movement of the multi-track tape for controlling playback thereof. Motor 32 is controlled by an on/off switch 34, which is operated by command controller 20. The apparatus of the invention is contained within a housing (not shown), which may be in the shape of a playstation, book, famous toy character, robot, or other embodiment. Positioned on the housing are a plurality of buttons 36, which are preferably conventional momentary switches, with each button corresponding to one of the tracks of the multi-track media. Each button 36 includes an associated lighting element 38, which may be an LED, incandescent light, or other lighting device, for illuminating its associated button 36. Lighting elements 38 are individually controlled by command controller 20 so as to enable each button 36 to be controllably lighted as desired. Each button 36 is preferably associated with one of the channels of the multi-track media and is connected the command controller 20. When a particular button is pressed, command controller 20 generates the necessary commands for switch controller 10 to select the channel associated with the button pressed for playback. In an alternative embodiment, each button 36 is connected to switch controller 10. When a particular button is pressed, switch controller 10 selects the channel of the multi-track media associated with that button for output to the speaker. A code discriminator 24 receives the signal of the channel being output by switches 12 and detects audible or inaudible command codes embedded within the content of the conversation on the multi-track media The detected command codes are output to command controller 20 in order to provide the functionality described below. In an alternative embodiment, as shown in FIG. 2 and discussed below, one of the channels of the multi-track media may be dedicated to storing command code information.

Switch controller 10 is preferably a relatively simple logic circuit for receiving the output of command controller 20 and/or buttons 36 for switching to one of the audio tracks on the basis of this output. For example, controller 20 may utilize a two-bit output which is received by switch controller 10 and by which switch controller 10 selects from amongst the 4 channels.

As described in greater detail below, the audio tracks include messages that require buttons 36 to be pressed in response thereto, such as true/false or multiple choice questions. These responses are received by command controller 20 which generates commands to switch controller 10 to select from amongst the four channels on the basis of the response. If desired, the present invention may be simultaneously utilized by a plurality of children if configured with multiple switch controllers 10, as generally described in commonly owned U.S. Pat. No. 3,947,972.

The multi-track tape 4 is preferably removable from the playback means 2 so that different multi-track tapes 4 having different interactive conversations stored thereon may be inserted and used in the apparatus of the invention. This makes it possible to record a library of prerecorded media covering a wide array of topics. For example, the media might contain mathematics problems at different levels, multiple choice trivia questions, learning exercises, or even interactive story telling. The removable media are preferably multi-track magnetic tape cartridges, but may be any removable multi-track media such as, for example, magnetic disk, optical disk, or other media appropriate for the present application. These removable multi-track tapes are preferably contained in rigid cartridges for convenient removal and replacement.

The apparatus of the present invention may comprise other embodiments. Rather than utilizing a multi-track magnetic tape or other removable media, the system might use any appropriate data storage means for containing the various conversational messages employed by the system, provided that the information stored thereon may be separated into tracks. For example, a conventional magnetic disk, CD or other optical disk, or even hardware, such as RAM, PROM, ROM or EPROM, could be used to store the information. The information data could be physically stored on individual disk tracks, or the data could be organized so that each track of information is randomly accessible as separate or separable files on the disk or storage media. In conjunction with a disk reader appropriate for the type of disk drive in use, or a microprocessor or microcontroller for reading the digital data from a hardware memory device, the information stored on the individual conversational tracks could be output to a user of the system in near real-time fashion.

When utilizing a disk or other physical media for storing digital data, it might be advantageous for a microprocessor to be provided for the purpose of first reading the various tracks into a memory cache, which would allow faster access to the conversational information. Thus, during operation in this instance, the microprocessor would read the serial track information from the disk into parallel tracks in cache memory in advance, while substantially simultaneously reading the track data from cache to memory to an output device. As the cache memory were depleted, it would be refilled from disk or other media by the processor. The microprocessor could be used in this instance also to provide the controller and switching functions.

Output to the user could be by various devices, depending on the type of media used. For example, if the stored conversations on the multi-track media are in digital form, i.e. CD-ROM, magnetic disk, DAT, the processor or other means could convert the digital information streams to analog signals for output to conventional headphones or could be output directly to digital headphones. Alternatively, the conversation stream could contain visual as well as audio signals. An audio/visual processor would generate the appropriate visual and audio signals. It is anticipated that the interactive system of the present invention could employ a large variety of multi-media inputs and outputs as such technologies develop. It is further anticipated that any storage means capable of storing and substantially simultaneously retrieving conversational data could be employed by the present invention. Whatever multi-track device is employed, it should preferably contain one track for each of the number of tracks to be used in the interactive conversation. In a preferred embodiment, four equal bandwidth tracks are used. It may, however, be advantageous to utilize a larger number of tracks to obtain more complex conversations and to exhibit more sophisticated memory type functions.

If the system were to be usable by only one person at a time and the command codes discussed below are embedded in the conversational content, the four channel audio amplifier could be replaced by a conventional one channel amplifier which amplifies only the one selected channel. As discussed below, if one channel is to be reserved for control commands, a conventional one channel amplifier could be used to read the control commands, if necessary, while another conventional one channel amplifier could be used to select from amongst the remaining channels for the interactive conversation.

The information is stored on each track in a plurality of reproducible information segments, each of which comprises a complete message reproducible by the playback device directly in response to the selection of the track upon which the segments are stored. Each of the information segments on the various tracks contain interrogatory messages with associated responses, responsive messages, informational messages, or combinations thereof. The messages contained on the various tracks are related in real-time to particular interrogatory messages, and correspond to the responses to the particular interrogatory messages so that an interactive conversation can occur as the media is played back and the user responds to the messages on the tracks by depressing buttons 36. As the user answers a particular interrogatory by depressing a button, the information on the track associated with the particular verbal response is routed to the output device unless a command code prevents such a switch or a command causes a switch to different track. On the selected track at the time at which the selection occurred, is an information segment whose content corresponds with the response to the previous interrogatory, whether or not the interrogatory was on the same track as the information segment being output. The various interrogatories, responsive messages, and informational messages may generally be contained on any or all of the various tracks provided that they are synchronized properly so as to retain a timed and seamlessly switchable relationship. Numerous examples of the types of conversations that are possible using this technique, including the use of decision tree logic to provide pseudo-memory and other customized functions, are described in the aforementioned U.S. Pat. Nos. 3,947,972; 5,313,510; and 5,340,317.

In order to understand the interactive conversational system of the invention, several examples will now be provided. Example 1 illustrates a relatively simple interactive conversation. In this example, command controller 20 is programmed to generate the following binary outputs depending upon the track that the command controller determines should be output:

| Channel to be Output | Binary Output |
|---|---|
| Channel #1 | 00 |
| Channel #2 | 01 |
| Channel #3 | 10 |
| Channel #4 | 11 |

Switch controller 10 receives the binary signal from controller 20 and selects a channel from channels 1, 2, 3 and 4 corresponding to binary outputs 00–11. Thus, if the Button 2 were detected by controller 20, the contents of channel 2 would be routed to the output device, provided that no control commands were being run that would prevent a playback of that channel.

In this example, button lighting codes are embedded within the content of the conversations. The codes may be either audible or inaudible, and of any appropriate type, provided that the codes may be received by code discriminator 24 and output to controller 20. For example, the codes may be of a particular frequency and duration, and code discriminator 24 may be a conventional analog or digital circuit to detect the frequency and duration of the tone. Alternatively, the different command codes may be at different frequencies so as to be distinguishable. For example, the tones may be the equivalent of conventional touch tones, with tone detector 24 being a conventional touch tone detector of the type known in the art. Upon receiving a signal from tone detector 24 corresponding to the tone detected, command controller 20 may use a conventional look-up table to determine the function associated with the command. The codes may also be a digital bit stream, with each code having a predetermined bit pattern, or an analog signal that may be converted to a digital bit stream. Command controller 20 then effectuates the command corresponding to the command code. In the Example, the command codes are shown in brackets. In addition to button lighting codes, codes may be implemented to stop playback of the storage media by controlling motor 32 by means of switch 34 to enable the user sufficient time to press the desired button. Playback begins when a response has been received or when a predetermined period of time has elapsed. Codes are also provided to stop playback as desired. In the Example, command codes are shown surrounded by brackets "[ ]", with the function of each command shown in the table below:

| COMMAND | FUNCTION |
|---|---|
| F(x) | Flash light associated with button number "x" |
| SF(x) | Stop flashing of button number "x" |
| F(all) | Flash all buttons |
| SF(all) | Stop flashing all buttons |
| PAUSE | Pause playback for a predetermined period or until a button is pressed |
| LOCK | Lock out buttons so that input from button occurs upon depression of the button |
| UNLOCK | Opposite of LOCK command |
| SWITCH | Causes switch to occur to channel associated with depressed button or as determined by command code |
| L(x) | Light button number "x" |
| SL(x) | Stop lighting of button number "x" |

EXAMPLE 1

| Ch. 1 | Ch. 2 | Ch. 3 | Ch. 4 |
|---|---|---|---|
| [LOCK] Hi it's me your favorite Famous Toy Character and for the first time ever, you and I can talk back and forth to each other. Let me show you. How are you today? [UNLOCK] [L(1)] Press this button if you're okay [SL(1)] or [S(2)] this button if you're <u>not</u> okay. [SL(2)]. Press now. [PAUSE] [F(all)] [SWITCH] [LOCK] [SF(all)] Oh great, you're okay. I'm so happy. I'm okay also. Now it's time for you to ask me a question. | Same as Ch. 1 | Same as Ch. 1 | Same as Ch. 1 |
| | [SWITCH] [LOCK] [SF(all)] Oh, too bad, you're not okay. Well I'll try to cheer you up. How about if you ask me a question? | [SWITCH] [LOCK] [SF(all)] You pressed a button that was not lit up! Follow instructions in the future. Now you can ask me a question. | Same as Ch. 3 |
| | If you want to ask about what I did last night [UNLOCK] [L(1)]press here [SL(1)], if you want to | Same as Ch. 1 | Same as Ch. 1 | Same as Ch. 1 |

-continued

| Ch. 1 | Ch. 2 | Ch. 3 | Ch. 4 |
|---|---|---|---|
| know how old I am [L(2)] press here [SL(2)], or if you want to know my favorite song [L(3)] press here [SL(3)]. Press now. [PAUSE] [F(all)] | | | |
| [SWITCH] [LOCK] [SF(all)] Oh so you want to know what I did last night; well I had turkey and mashed potatoes for dinner and then I took a long bath. I went to sleep about 10 o'clock. | [SWITCH] [LOCK] [SF(all)] Oh so you want to know how old I am. This is a bit of a personal question but I'll answer it for you anyway. I am 7 years old. Actually 7 1/2 years old. | [SWITCH] [LOCK] [SF(all)] Oh so you want to know what my favorite song is. My favorite song is Bingo; you know "BINGO and Bingo was his name oh." I love that song. | [SWITCH] [LOCK] [SF(all)] You did not press a button that was lit up. Please follow instructions in the future. It is very important. |
| Now I have a big surprise for you. If you answer all of my next three questions right, Pocahontas will come here and you can talk to her and she'll talk to you. Don't worry, I'll keep track of your answers. | Same as Ch. 1 | Same as Ch. 1 | Same as Ch. 1 |
| Here's question number one. What movie is the song Hakuna Matata from? (Music plays under) [UNLOCK] [L(1)] Pinnochio [SL(1)], [L(2)] Lion King [SL(2)], or [L(3)] Cinderella [SL(3)]. Press now. [PAUSE] [F(1,2,3)] | Same as Ch. 1 | Same as Ch. 1 | Same as Ch. 1 |
| [SWITCH] [LOCK] Uh Oh, you made a mistake but I want you to meet Pocahontas so I'll be nice and give you a second chance at this. Go ahead try again. [UNLOCK] [L(1)] Pinnochio [SL(1)], [L(2)] Lion King [SL(2)], or [L(3)] Cinderella [SL(3)]. Press now. [PAUSE] [F(1,2,3)] (Music plays.) | [SWITCH] [LOCK] Well I see you have made a choice and pressed a button. This will take a moment for me to see if you are right or wrong. Hold on. (filler music) | Same as Ch. 1 | Same as Ch. 1 |
| [SWITCH] [LOCK] [SF[1,2,3] Oh too bad, I gave you two tries at this answer, but you are still wrong. The correct answer was Lion King. | [SWITCH] [LOCK] [SF[1,2,3] Finally I can tell you that you are right. Hakuna Matata comes from the Lion King. Good answer. | Same as Ch. 1 | Same as Ch. 1 |
| Here is question number two. And remember, I'm keeping track. I'll make this question a little easier for you. Which animal has the longest trunk? Look at the buttons and press [UNLOCK] [L(1)] rhinoceros [SL(1)], [L(2)] whale[SL(2)] or [L(3)] elephant[SL(3)]. Answer now. [PAUSE] [F(1,2,3)] | Here is question number two. Since you got that last question right, I'll make this question a little harder for you. Who sang the hit song "Don't Cry For Me Argentina"? Here are three choices. [UNLOCK] [L(2)] Janet Jackson[SL(2)], [L(3)] Tiffany[SL(3)] or [L(4)] | Same as Ch. 1 | Same as Ch. 1 |

-continued

| Ch. 1 | Ch. 2 | Ch. 3 | Ch. 4 |
|---|---|---|---|
| | Madonna[SL(4)]. Press now. [PAUSE] [F(1,2,3)] | | |
| [SWITCH] [LOCK] [SF(1,2,3,4)] Elephant is right! Good answer. The elephant does have the longest trunk. | [SWITCH] [LOCK] [SF(1,2,3,4)] Sorry. You are wrong. I wish you were right but you are not. Too bad. | Same as Ch. 2 | [SWITCH] [LOCK] [SF(1,2,3,4)] Madonna is correct. You know a lot about music. Good luck on question #3. |
| Here is question number three. Which is the largest planet in our solar system? [UNLOCK] [L(1)] Jupiter[SL(1)], [L(2)] Saturn[SL(2)], or [L(3)] Earth[SL(3)]? Answer now. [PAUSE] [F(1,2,3)] | Same as Ch. 1 | Same as Ch. 1 | I'll make question #3 a little harder still. Which is the smallest planet? [UNLOCK] [L(2)]Saturn[SL(2)], [L(3)]Earth[SL(3)] or [L(4)]Mercury[SL(4)]? Answer now. [PAUSE] [F(2,3,4)] |
| [SWITCH] [LOCK] [SF(1,2,3,4)] You are right. Nice work. Jupiter is the largest planet. | [SWITCH] [LOCK] [SF(1,2,3,4)] Good guess but Saturn is wrong. Better luck next time. | [SWITCH] [LOCK] [SF(1,2,3,4)] Good guess but Earth is wrong. Better luck next time. | [SWITCH] [LOCK] [SF(1,2,3,4)] You are right. Nice work. Mercury is the smallest planet. |
| Guess what? I was keeping track of how many answers you got right and wrong, and unfortunately you did not get all three of these questions right so you cannot meet Pocahontas this time. Maybe next time you play this program, you will get all three right and then you can talk to Pocahontas. Here is another question for you. Etc. | Same as Ch. 1 | Same as Ch 1 | Guess what? I was keeping track of how many answers you got right and by answering Lion King on the first questions, Madonna on the second question and Mercury on the third question, you got all three answers right! That's wonderful. You are very smart. Now as I promised here is your interview with Pocahontas. Before she talks to you she wants to know if you are a girl or a boy. Look at the buttons. If you are a girl press this button, if you are a boy press this button. Press now. Etc. |
| End | End | End | End |

As the example shows, by using the command codes it is possible to achieve several goals not possible in prior interactive systems. For example, the LOCK command prevents the user from switching between channels during portions of the program during which user input has not been requested. In prior systems, the user could switch at any point, which might affect the accuracy of the content of the interactive program. Also, by using the SWITCH command, the program only switches at designated switch points, using input which may have occurred somewhat earlier in the program. This leads to improved seamlessness and enables the system to switch more frequently than in the prior switching, since the user input does not directly control the switching. This also permits the system to accumulate inputs from the user before switching. For example, the system may ask multiple interrogatories, e.g., sex and age, the inputs of which are stored in memory, as discussed below, before switching to an appropriate channel, e.g. boy under 5 years old, etc. Of course, it is not necessary to use separate memories to store each individual user response. Instead, the results may be stored by the microprocessor as a digital word, with each bit representing the response to a particular interrogatory, or with the numerical value being varied depending upon the responses and using a look-up table to determine the correspondence of the stored value and the responses.

If visual output is to be used in an embodiment of the present invention, the visual display might correspond with the questions asked in the course of the conversation. If it were desired to use a touch screen, the screen display might include labels for the multiple choice selections that could be used to provide switching in combination with the switching disclosed herein. Command codes to provide visual indicia to highlight the labels corresponding to each response may be implemented as desired.

In Example 2, three tracks, i.e., tracks 1–3, are used to store the interactive information. The fourth track, i.e., track 4, is used to store command code information. As shown in FIG. 2, a microprocessor 26 is utilized to read track switching instructions from the audio tape itself in order to perform the functions related to the command codes. In this example, the code discriminator is built into the microprocessor 26 or other command controller.

In an alternative embodiment, a conventional one channel amplifier (if necessary, as it may be possible to read the codes directly from the media) preferably reads audible control commands for the microprocessor from Channel 4, while another conventional one channel amplifier plays back the selected one of the remaining channels for playing the story content. Microprocessor 26 controls conventional switches to determine which channel containing interactive content is routed to the amplifier.

In order to perform the memory functions discussed below, microprocessor 26 is equipped with RAM or other memory. In this example, the commands are shown by function, it being appreciated that the commands may be encoded using any desired encoding system.

EXAMPLE 2

| Ch. 1 | Ch. 2 | Ch. 3 | Ch. 4 |
| --- | --- | --- | --- |
| Hi. I'm you new pal Mr. "Toy". I can talk to you and you can push buttons to communicate back to me. I will remember everything you do, I can make questions harder if you are right and easier if you are wrong and I will sum up all your answers at the end. Let's get going. This program is all about animals. | Same as Ch. 1 | Same as Ch. 1 | Lock out Buttons |
| If you are a girl, press this button. | | | Light up button #1. |
| If you are a boy, press this button. | | | Light up button #2. |
| Press now. | | | Flash buttons #1 and #2 alternately. Unlock Buttons 1 and 2 only. Pause for 5 seconds or until button is pressed. |
| Oh, I can see you are a girl. Well nice to meet you little girl. | Oh, I can see you are a boy. Well nice to meet you little boy. | Oh, you made a mistake so I guess I'll just call you friend. | If no button pressed, switch to Ch. 3. Stop Flashing. Lock Buttons. Put channel being played in memory "A". |
| I will now ask you 4 questions. If you get all 4 right, I will tell you 2 funny jokes as a reward. If you get 3 right, I'll tell a funny joke. Here we go. | Same as Ch. 1 | Same as Ch. 1 | |
| Which is the only animal in the jungle that cannot jump? | Same as Ch. 1 | Same as Ch. 1 | |
| Press this button for rhinoceros, | Same as Ch. 1 | Same as Ch. 1 | Light up button #1 |
| this button for cow or | | | Light up button #2. |
| this button for elephant. | | | Light up button #3. |
| | | | Unlock Buttons 1, 2, and 3. Flash 1,2,3. Pause for 5 seconds or until button is depressed. |
| Rhinoceros is wrong. Only elephants cannot jump. | Cow is wrong. Only elephants cannot jump. | Elephant is right. Good work. Only elephants cannot jump. | Lock Buttons. Stop Flashing. If Button 3 was pressed, add 1 to memory "X". Put channel being played in memory "B". |
| Here is question #2 little girl. | Here is question #2 little boy. | Here is question #3 my friend. | Recall and switch to channel in memory "A". |
| I will make this question easier because you got question #1 wrong. | Same as Ch. 2 | I will make this question harder because you got question #1 right. | Recall and switch to channel in memory "B". |

-continued

| Ch. 1 | Ch. 2 | Ch. 3 | Ch. 4 |
|---|---|---|---|
| Now listen carefully, little girl. | Now. listen carefully, little boy. | Now listen very carefully. | Recall and switch to channel in memory "A". |
| What is a baby cat called? You see, I told you it would be easy. | Same as Ch. 1 | What is a baby horse called. Now be careful, this is tricky. | Recall and switch to Ch. in mem. "B". |
| If you think the answer is pup, press here. | Same as Ch. 1. | If you think the answer is pup, press right here. | Light up button #1. |
| If you think the answer is kitten, press here. | | If you think the answer is foal, press here. | Light up button #2 |
| And if you think it is dog, press here. | | And if you think the answer is pony press here. | Light up button #3. |
| | | | Unlock buttons 1, 2, and 3. Flash buttons 1, 2, and 3. Pause for 5 seconds or until button is pressed. |
| Sorry, too bad, but you're wrong. | Good work. You are absolutely correct. Good work. | Same as Ch. 1 | Lock Buttons. Stop flashing. |
| | | | If on Ch. 2, add 1 to register "X". Put channel being played in memory "C". |
| OK. Let's go on, I can see | Same as Ch. 1 | Same as Ch. 1 | |
| you missed my first question and | Same as Ch. 1 | you got my first question correct and | Recall and switch to Ch. in mem. "B" |
| you got my second question wrong. | you got my second question right. | Same as Ch. 1. | Recall and switch to Ch. in mem. "C" |
| OK, little girl. Here is Question #3. | OK, little boy. Here is Question #3. | OK, my little friend. Here is Question #3. | Recall and switch to Ch. in mem. "A" |
| You know, since you did not know that the elephant is the only animal that cannot jump, I'll ask you an easier question about an elephant. | Same as Ch. 1 | You know, since you knew that the elephant was the only animal that can jump, I'll ask you a harder question about elephants for question #3. | Recall and switch to Ch. in mem. "B" |
| Here is question #3. What does an elephant have that no other animal has? | Same as Ch. 1 | For question #3. Which of these does an elephant have that is better than any other animal? Is it: | |
| a trunk | Same as Ch. 1 | a memory, | light up button #1 |
| a stomach | | a nose | light up button #2 |
| or hair on its body | | or straight teeth | light up button #3 put channel being played in memory "D" |
| | | | Unlock Buttons. Flash Buttons 1, 2, and 3. Pause 5 seconds or until button is pressed. |
| Well, little girl, I have to tell you . . . | Well, little boy, I have to tell you . . . | Well, isn't this interesting? Very interesting. | Lock Buttons. Stop Flashing. |
| | | | Recall and switch to Ch. in mem. "A" |
| You are 100% right! You should run for president. | Maybe your brain is on vacation! Sorry your answer is wrong. | Same as Ch. 2 | Recall and switch to Ch. in mem. "D". If on Ch. 1 add 1 to mem. "X" |
| Here is your last question about animals. Which animal runs the fastest? | Same as Ch. 1 | Same as Ch. 1 | |
| Dog | Same as Ch. 1 | Same as Ch. 1 | light up button #1 |
| Cheetah, or | | | light up button #2 |
| Horse | | | light up button #3 light up Ch. 1,2 & 3 alternately. |

-continued

| Ch. 1 | Ch. 2 | Ch. 3 | Ch. 4 |
|---|---|---|---|
| | | | Unlock Buttons. Flash Buttons 1, 2, and 3. Pause 5 seconds or until button is pressed. |
| | You are smarter than you look. This was a very hard question but you answered Cheetah and you are 100% correct. | Perhaps your brain has blown a fuse. Horse was a good try but Cheetah is the right answer. | Lock Buttons. Stop Flashing.<br><br>Put Ch. being played in mem. "E"<br>If on Ch. 2 add 1 to memory "X" |
| Cheetahs can run 70 m.p.h., the fastest of any animal on Earth | Same as Ch. 1 | Same as Ch. 1 | |
| Well little girl, it's time to see how you did. | Well little boy, it's time to see how you did. | Well, my friend, it's time to see how you did. | Recall and switch to Ch. in mem. "A" |
| You answered Rhinoceros for question #1 and that was wrong. | You answered Cow for question #1 and that was wrong | You answered elephant for question #1 and that was right. | Recall and switch to Ch. in mem. "B" |
| You got question #2 wrong | You got question #2 right | Same as Ch. 1 | Recall and switch to Ch. in mem. "C" |
| Question #3 right | Question #3 wrong | Same as Ch. 2 | Recall and switch to Ch. in mem. "D" |
| and you answered dog for question #4 and that was wrong. | and you answered Cheetah for question #4 and that was right | and you answered horse for question #4 and that was wrong | Recall and switch to Ch. in mem. "E"<br>If 4 in mem. X go to Ch.1. If 3 in mem. X go to Ch. 2. If 0,1 or 2 in mem. X go to Ch. 3. |
| so in total, you got all 4 questions right, so there are 2 jokes that you earned. | so in total you got 3 out of 4 questions right. So here is the one joke you earned. | so in total you did not do so well and do not get to hear any of my jokes | put Ch. being played in mem. "E" |
| Joke #1<br>Why did the prune go out with a fig?<br>Couldn't get a date! (laugh) | Why was six afraid of seven?<br><br>Because seven ate nine! (laugh) | Well, its almost time for me to<br><br>say goodbye | |
| Joke #2.<br>Why are Saturday and Sunday the strongest days?<br>Because the rest are weak days! (laugh) | Pretty funny joke if I do say so myself.<br>Well, maybe next time you will get all my questions right and then you can hear 2 jokes! | Remember what ;you learned on this program because the next time you pay this tape maybe you will get more answers right | |
| Well little girl, its time for me to say goodbye. | Well little boy, its time for me to say goodbye. | And get to hear some of my jokes.<br>I hope so. | Recall and switch to Ch. in mem. "A" |
| Congratulations again on getting all the questions right | I enjoyed working with you.<br>Take care and have a nice day. | I enjoyed working with you very much | Recall and switch to Ch. in mem. "E" |
| Goodbye | Goodbye | Goodbye | |
| END | END | END | |

If desired, the system may use non-volatile RAM, a battery backup, or other system to prevent memory loss when the system is shut off, etc. In this manner, when the user returns to the system, memories of prior responses will be stored so that the system may, for example, remember that the user was a boy. Of course, a reset button may be provided, if desired.

In the system of the invention, each button need not be associated with playback of a particular track. Instead, the command codes may provide for switching to any desired track in response to any command or button depression. Accordingly, the system of the invention may use a data entry system with more buttons than the number of channels, e.g., a keypad or keyboard, with the response from the keys being used as input in order to cause a switch in accordance with the command structure. Such commands are shown in the following table:

| COMMAND | FUNCTION |
| --- | --- |
| S(x) | Switch to Channel X |
| On Button (x) Switch to Channel (y) | If Button x is pressed, switch to Channel y |
| On No Button, Switch to Channel (x) | If no button is pressed, switch to Channel y |

If a key is pressed that is not mapped to an outcome, the key may be ignored or a switch to a channel that informs the user to "follow instructions better" may occur. Also, if no input is made by the user, a switch to an "incorrect answer" channel may occur or a switch to a channel that informs the user "you have not answered" may occur. Effectively, the system of the invention utilizes a relatively simple programming language, with associated programming structures, e.g., if . . . then . . . else, goto, pause, on key( ) , and other statements, to provide a higher level of interactivity with improved seamlessness. Using the system, multiple user inputs may be accepted, with the system using the multiple inputs to switch in accordance with the command structure. For example, if memory "A" is a binary memory and contains a user response to a boy/girl interrogatory, and memory "B" is a binary memory and contains a user response to an over/under 5 years old interrogatory, the command codes might then include the command "if A=0 (boy) and B=1(over 5) then switch to track C." The programming commands are stored on the command code track or on the tracks with the interactive content.

The use of command codes permits the system to branch between tracks very accurately because the branches occur at precisely defined points and are done by the microprocessor rather than being switched manually by the user as in prior systems. This enables the system to be switched more often, and to switch automatically, i.e., with no user input, for features such as a recap of prior user inputs. Branching between tracks in the system is not necessarily associated with a manual user input as in prior systems, and branches based upon user responses may be delayed or occur as a result of programming logic that uses the user response as an input. Also, in prior systems it was possible for the user to disrupt an interactive conversation by pressing an incorrect button or by pressing at the wrong time. By locking out user input, and by having all track switches performed by the microprocessor, with appropriate logic checks, such interruptions and breaks in logic may be prevented.

In addition to the lights associated with each button, other signaling means may be provided to the user. For example, the system may include other lights, buzzers, speakers, or animatronics (e.g., moving parts) that are operated by the command codes. The command codes may be used to control these peripheral devices as desired. For example, the system may flash a light a predetermined number of times and then question the user as to how many times the light flashed. The system could also use the lights, buzzer, or animatronics to signal correct or incorrect answers.

Example 3 shows the use of the system of the invention to enable two separate characters or other programs to be interactive using one cassette tape or other media and for the programs to be kept completely separate, with no possibility of cross-over into the other program as was possible in prior systems. The character the user wants to interact with can be chosen by the user at the beginning of the program via a simple question (e.g., if you want Ernie to be the host of this tape press 1, Burt, press 2). In the example, Ch. 1 will always have Ernie's voice and Ch. 3 will always have Burt's voice. Channel 2 is a "swing" channel that alternates between both voices unbeknownst to the user. Even though 3 (or more choices) can be given for a particular question, all the wrong answers are grouped on to the one channel and the right answer on the other channel.

EXAMPLE 3

| Ch.1 | Ch.2 | Ch.3 | Ch.4 |
| --- | --- | --- | --- |
| HI, I'M ERNIE. | | Hi, I'm Burt | (Instructions for microprocessor) |
| WHO DISCOVERED AMERICA? (IN ERNIE'S VOICE) | | Same as Ch. 1(in Burt's voice) | |
| COLUMBUS, BALBOA OR MAGELLAN? ANSWER NOW. | | Now, listen carefully, since I will give you 3 chances. | Lights will be turned on and off at the appropriate times via commands on Ch 4. |
| COLUMBUS IS RIGHT. GOOD ANSWER. | YOU ARE WRONG. TOO BAD. COLUMBUS DISCOVERED AMERICA. | Is the answer Columbus, Balboa or Magellan? Answer now. | If on Ch. 1, then if buttons 2 or 3 are pressed, go to Ch. 2, otherwise stay on Ch. 1. |

-continued

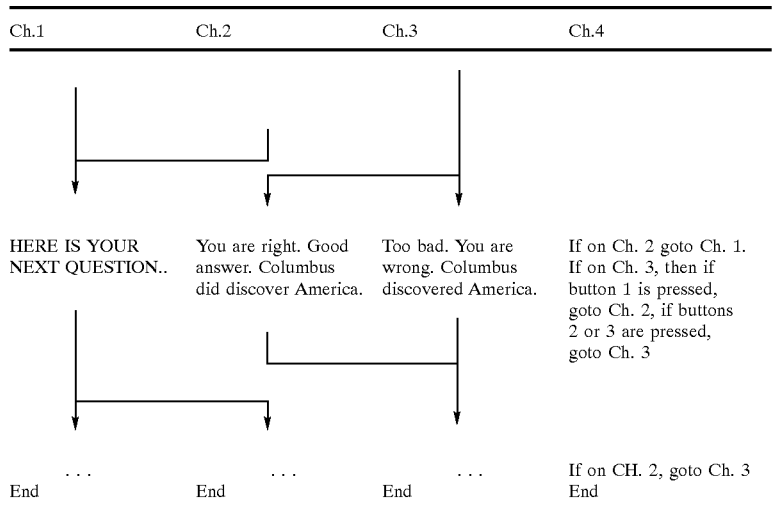

| Ch.1 | Ch.2 | Ch.3 | Ch.4 |
|---|---|---|---|
| HERE IS YOUR NEXT QUESTION.. | You are right. Good answer. Columbus did discover America. | Too bad. You are wrong. Columbus discovered America. | If on Ch. 2 goto Ch. 1. If on Ch. 3, then if button 1 is pressed, goto Ch. 2, if buttons 2 or 3 are pressed, goto Ch. 3 |
| ... End | ... End | ... End | If on CH. 2, goto Ch. 3 End |

If desired, the system may include a command to set a start track on which the system begins playback. The start track command may be implemented as a direct command code, e.g., "switch to Ch. 1, or vary depending upon an external input. For example, the invention may be implemented in a case that looks like a cassette player but that also includes one or more input slots. The user may then be provided with a plurality of different dolls, keys, or other activation devices, each of which relates to a different character, e.g., Ernie and Burt, or Ken and Barbie, or Boy or Girl. Each doll or key is configured so that when it is inserted in the slot (or a slot associated with that activation device, e.g., the Ken slot) it closes a different switch. The system detects the switch closure and automatically switches the media to conversational content associated with that activation device. For example, the media may include a "Ken" program that starts of Ch. 1, and a Barbie program that starts on Ch. 3. The slot on the housing includes a plurality of electrical contacts or switches therein. Each of the Ken and Barbie figures includes an electrical contact on the portion thereof inserted into the slot, with each contact being in a slightly different location so that the Ken doll closes one switch in the slot, and the Barbie doll closes a different switch. Command codes on the media determine which channel is associated with each switch, and the microprocessor switches the media to the appropriate track. If separate slots are used for each activation device, the slots are preferably keyed to prevent insertion of the incorrect activation device. Each slot may then include any desired activation switch.

Additional command codes may be implemented as well, as desired. For example, the system may include a relatively simple voltmeter to check battery voltage. Toward the end of each media, a command code would cause a voltage reading to be taken. In the event the voltage were low, the microprocessor would switch to a track of the media that would include an informational message to the user that the batteries are in need of replacement.

Thus, using the command structure of the interactive conversational apparatus of the invention, it is possible to provide improved functionality so as to make the apparatus more responsive, interesting and educational. For example, the system enables the following functions:

1. Responses remembered and referred to throughout the program (e.g., boy or girl).
2. Questions can be made more difficult if a child's performance warrants it (which helps to widen the age-range applicability of each program).
3. The character on the program can refer to any prior response given by the user at any time (e.g., "good work little girl," "remember about 10 minutes ago you missed that same question and now you got it right" or, "you seem to be good on the trivia questions").
4. A complete recap of all responses given by the user may be supplied at the end of the program.
5. Totalization of score during the recap (e.g., "you got them all correct," or "sorry you didn't do so well").
6. Music and sound effects are unaffected by conversational branching.
7. Children who cannot read can still operate the system because of the visual indicia.
8. The system will operate with logic that is independent of inappropriate user input(i.e., user cannot "fool" the system).
9. The system can operate without a delay for the answer period.
10. The system can seamlessly branch as many times as desired to create complex responses and interactive conversational feedback.
11. When branching occurs is unbeknownst to the user.

Although the present invention has been described in detail with respect to certain embodiments and examples, variations and modifications exist that are within the scope of the present invention as defined in the following claims.

What is claimed is:

1. An interactive conversational apparatus which comprises:

a storage media which comprises a plurality of temporally related data storage tracks containing interactive conversational content, the interactive conversational content being stored on each track in a plurality of information segments, each of the segments comprising a complete message reproducible in response to the selection of the track upon which the segments are stored, each of the information segments being capable of comprising interrogatories having responses, responsive messages, conversational messages, informational messages, or combinations thereof related in real-time and content to information contained in at least one information segment of at least one track, the information stored on the tracks in a predetermined timed sequence for providing interactive pathways through the tracks dependent upon the responses, the storage media further comprising command code information;

playback means for facilitating playback of the interactive conversational content of a selected data storage track;

command code reading means for reading the command code information from the storage media and for generating track selection information based upon the command codes;

user-input response means for receiving responses from a user based upon the interactive conversational content; and track selector means for receiving the track selection information and user-input responses, and for seamlessly selecting and accessing one of the tracks of the storage media in response to the user-input responses and the command code information for retrieving the information stored on the selected track for enabling the playback of the retrieved information via the playback means to thereby playback the interactive conversational content.

2. The apparatus according to claim 1 wherein one of the data storage tracks contains the command codes, the playback means comprising command code playback means for providing playback of the track containing the command codes independently of the tracks comprising the interactive conversational content.

3. The apparatus according to claim 2 wherein the temporally related data storage tracks are stored on a magnetic storage media having a plurality of coextensive tracks wherein the command code playback means comprises magnetic storage media reading means for the command code track, and the playback means comprises at least one magnetic media storage reading means for the coextensive tracks comprising the interactive conversational content.

4. The apparatus according to claim 1 wherein the temporally related data storage tracks are stored on a magnetic storage media having a plurality of coextensive tracks wherein the playback means comprises magnetic storage media reading means corresponding with each of the plurality of coextensive tracks.

5. The apparatus according to claim 1 wherein the tracks are stored digitally and are randomly accessible.

6. The apparatus according to claim 5 wherein the storage media is selected from the group consisting of magnetic disk, compact disk, video disk, magnetic tape, RAM, PROM, EPROM, and EEPROM.

7. The apparatus according to claim 1 wherein the data storage media are analog cassette tapes and wherein the playback means enables the removal and replacement of the storage media.

8. The apparatus according to claim 1 wherein the command codes comprise memory storage commands and memory switching commands, the apparatus farther comprising means for storing a first identification of a current track being played back in response to a memory storage command, and means for switching to the track associated with the first identification in response to a memory switching command.

9. The apparatus according to claim 1 wherein the tracks comprising interactive conversational content comprise audible or inaudible control commands for the command code reading means.

10. The apparatus according to claim 9 further comprising means for discriminating the audible or inaudible control commands from the interactive conversational content.

11. The apparatus according to claim 1 wherein the command codes further comprise memory storage commands and memory switching commands, the apparatus further comprising means for storing at least a first identification of a current track being played back in response to a memory storage command, and means for switching to the track associated with the at least a first identification in response to a memory switching command.

12. The apparatus according to claim 1 wherein the command codes comprise a switch-to-track command having an associated track number, the track selector means selecting the associated track upon receiving such command.

13. The apparatus according to claim 1 further comprising a memory for storing information based upon the command code information.

14. The apparatus according to claim 13 wherein the command codes comprise a switch-to-track-in-memory command for switching to a track stored in the memory, the track selector means selecting the track in the switch-to-track-in-memory command upon receiving such command.

15. The apparatus according to claim 14 wherein the command codes further comprise an accumulation code for incrementing or decrementing the memory based upon user-input track selections.

16. The apparatus according to claim 15 wherein the command codes further comprise a code for storing in memory a response to a particular interrogatory, and a code for switching to a particular track based upon the response to the interrogatory stored in the memory.

17. The apparatus according to claim 1 wherein the user-input response means comprises a plurality of switches, each switch comprising selectively operable visual indicia, the command codes comprising codes for selectively operating the visual indicia.

18. The apparatus according to claim 17 wherein codes to selectively operate the visual indicia comprise codes selected from the group consisting of i) a code to selectively operate the visual indicia of a particular switch in timed relation to interactive conversational content related to the particular switch; and ii) a code to selectively flash the visual indicia of a particular switch.

19. The apparatus according to claim 17 wherein the visual indicia is a light.

20. The apparatus according to claim 1 wherein the command codes are selected from the group consisting of i) start playback, ii) stop playback, and iii) pause playback until a user-input response is received.

21. The apparatus according to claim 1 wherein the command codes are selected from the group consisting of i) activate/deactivate light, ii) activate/deactivate buzzer, and iii) check battery.

22. The apparatus according to claim 1 further comprising a switch for detecting one of a plurality of activation devices associated with a particular media, and wherein the command codes comprise a command to switch the media to a starting track associated with a selected activation device.

\* \* \* \* \*

UNITED STATES PATENT AND TRADEMARK OFFICE
CERTIFICATE OF CORRECTION

PATENT NO. : 6,108,515
DATED : August 22, 2000
INVENTOR(S) : Michael J. Freeman

It is certified that error appears in the above-identified patent and that said Letters Patent is hereby corrected as shown below:

<u>Column 24, claim 15,</u>
Lines 30-31, please change "upon the user-input track selections" to -- upon user-input track selection --.

Signed and Sealed this

Nineteenth Day of March, 2002

Attest:

JAMES E. ROGAN
Attesting Officer
Director of the United States Patent and Trademark Office